Jan. 27, 1959   B. S. HOLLIS   2,871,030
EQUIPMENT HITCH FOR VEHICLES
Filed July 6, 1956   2 Sheets-Sheet 1

INVENTOR.
BROOKS S. HOLLIS,
BY
McMorrow, Berman & Davidson
ATTORNEYS.

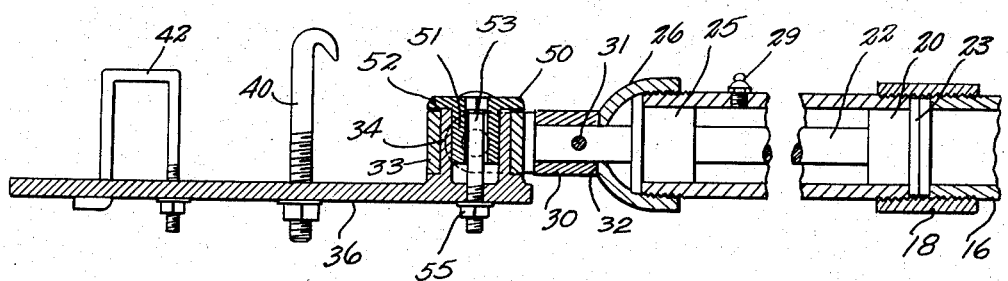
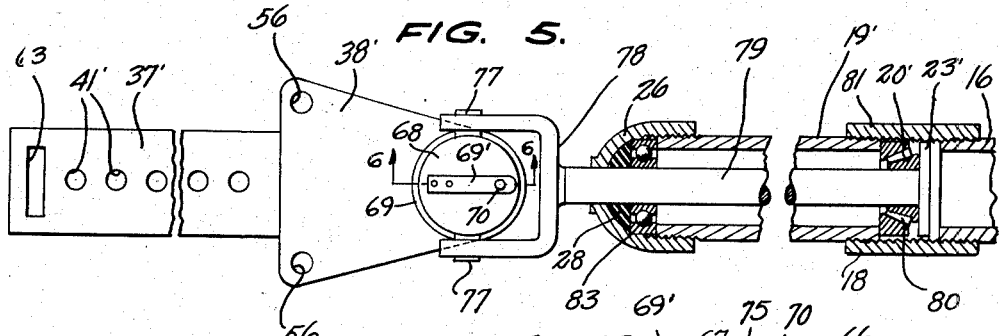
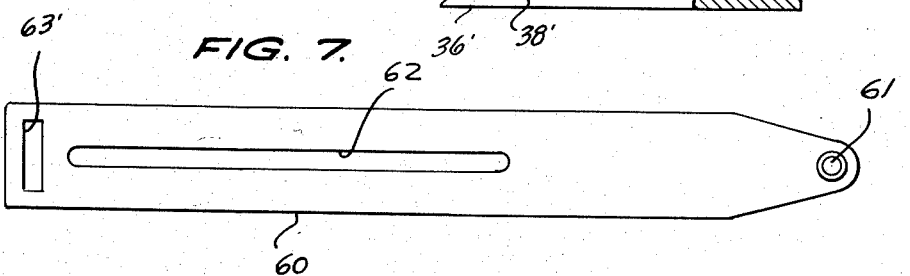
INVENTOR.
BROOKS S. HOLLIS,
BY
McMorrow, Berman + Davidson
ATTORNEYS.

United States Patent Office 2,871,030
Patented Jan. 27, 1959

2,871,030
EQUIPMENT HITCH FOR VEHICLES
Brooks S. Hollis, Simsboro, La.
Application July 6, 1956, Serial No. 596,192
1 Claim. (Cl. 280—492)

This invention relates to hitch devices, and more particularly to a novel and improved trailer hitch assembly.

The main object of the invention is to provide a novel and improved trailer hitch assembly which is simple in construction, which involves only a few parts, and which provides a flexible connection allowing angling around three mutually perpendicular axes.

A further object of the invention is to provide an improved equipment hitch assembly which involves inexpensive parts, which is easy to attach to a towing vehicle, such as an automobile, or the like, and which provides a secure connection between the towing vehicle and the trailer vehicle while at the same time allowing free angling of the trailer vehicle with respect to the towing vehicle.

Further objects and advantages of the invention will become apparent from the following description and claim, and from the accompanying drawings, wherein:

Figure 4 is a vertical cross sectional view taken on the line 4—4 of Figure 3.

Figure 5 is a fragmentary top plan view, partly in horizontal cross section of a modified form of equipment hitch assembly according to this invention.

Figure 6 is an enlarged elevational detail view, partly in vertical cross section, taken on the line 6—6 of Figure 5.

Figure 7 is a top plan view of an extension bar which may be employed with the assembly of Figures 5 and 6 when the assembly is used on vehicles wherein the rear cross member of the vehicle frame is a substantial distance forwardly of the rear bumper of the vehicle.

Figure 1:
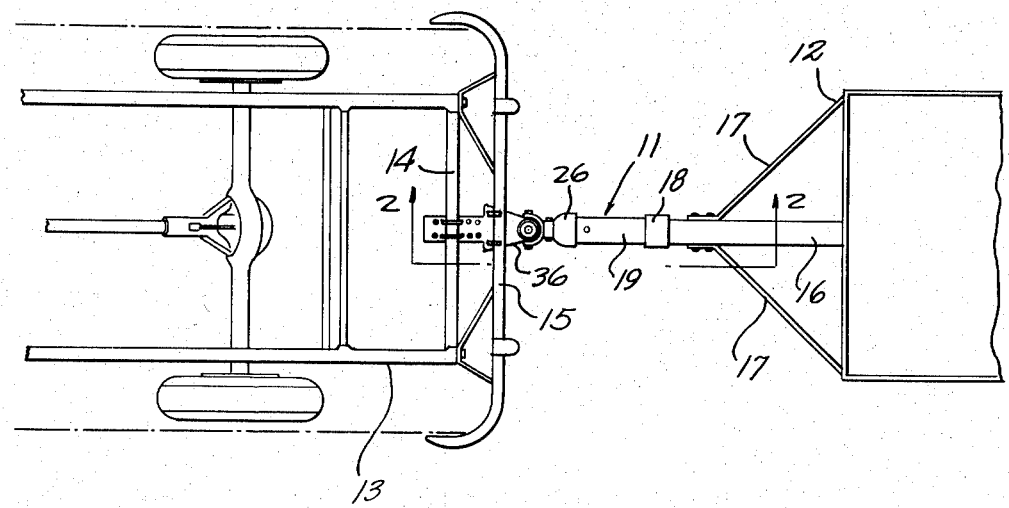
Figure 1 is a top view of the rear portion of a frame of an automobile and the forward portion of a trailer, showing the use of an improved equipment hitch assembly according to the present invention to connect the trailer vehicle to the automobile frame.

Referring to the drawings, and more particularly to Figures 1 to 4, 11 generally designates an equipment hitch assembly in accordance with the present invention. As shown in Figure 1, the hitch assembly may be employed to connect a trailer vehicle 12 to the frame 13 of a conventional automobile. The frame 13 comprises the rear cross member 14 which is located a short distance forwardly of the rear bumper 15 of the vehicle.

Figure 3:
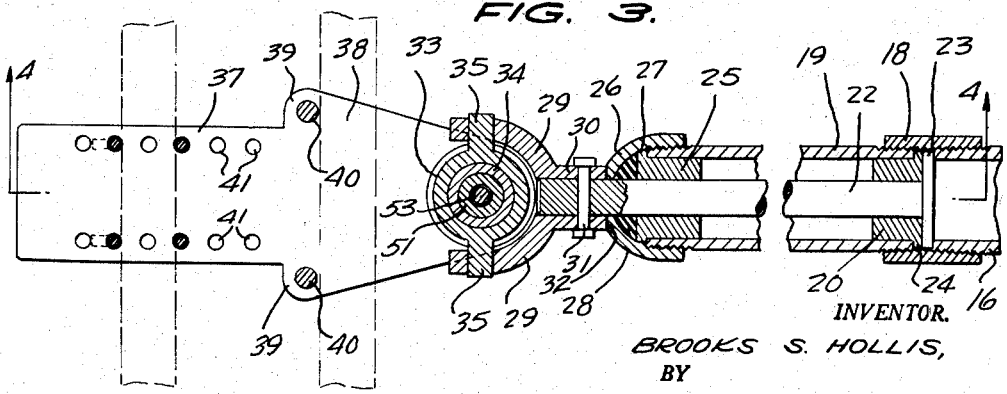
Figure 3 is a horizontal cross sectional view taken on the line 3—3 of Figure 2.

The trailer 12 is provided with a tubular drawbar 16 which is rigidly braced to the frame of the trailer by the respective diagonally extending side braces 17, 17. The drawbar has threadedly engaged on its forward end a coupling sleeve 18, which in turn receives the threaded rear end of a cylindrical housing member 19. Secured in the rear end of the housing member 19 is an annular bushing member 20 through which rotatably extends a shank 22 having a circular head portion 23 rotatably received in the space between the flanged end portion 24 of bushing 20 and the rim of drawbar 16, as shown in Figure 3. The shank 22 extends rotatably through an annular bushing 25 secured in the forward end of the tubular housing 19 and extends through a cap member 26 threadedly engaged on the forward end of housing 19. As shown in Figure 3, the forward bushing 25 has an end flange 27 which is engaged between cap member 26 and the rim of the tubular housing 19, the space between the flanged forward surface of bushing 25 and cap 26 being filled with deformable sealing material 28.

Tubular housing 19 is provided with a conventional lubricant fitting 29 through which grease or similar lubricant may be admitted into housing 19 to lubricate shank 22 and to facilitate the free rotation of said shank in the housing on the longitudinal axis of the housing.

Secured to the forward end of the shank element 22 by a transverse rivet 31 or by any other suitable fastening means is a sleeve element 30 which is formed with a pair of arcuate yoke arms 29, 29, the rear annular edge of the sleeve element 30 being rotatably engaged on an annular flattened surface 32 formed on the cap member 26. Thus, the member 30 is rigidly secured to the shank element 22 but is freely rotatable with respect to the housing 19 around the axis of said shank element 22.

As shown in Figure 3, the arms 29, 29 are arcuate in shape and extend around a portion of a collar member 33 which is rotatably engaged on a vertical, upstanding cylindrical stud member 34. Collar member 33 is provided with the oppositely extending transverse pivot lugs 35, 35 which rotatably engage in apertures provided in the respective arms 29, 29, whereby the shank 22 and the housing 19 containing same may pivot freely around the transverse axis defined by the pivot lugs 35, 35, and whereby the housing 19 may rotate freely around the axis defined by shank 22 simultaneously with the pivotal movement thereof around the transverse axis of lugs 35, 35.

Designated at 36 is a main supporting bracket which is provided with the forwardly extending, generally rectangular portion 37 and the tapering rear portion 38 which is enlarged in width at 39, 39 with respect to the forward portion 37 and which is apertured to receive a pair of vertical hook bolts 40, 40. The forward portion 37 is formed with respective rows of apertures 41, 41 spaced along its longitudinal margin, said apertures being spaced to receive the legs of respective U bolts 42, 42 engageable over the rear cross member 14 of the vehicle frame 13 in the manner shown in Figure 2 to fasten the main bracket plate 36 beneath the cross member 14.

Figure 2:
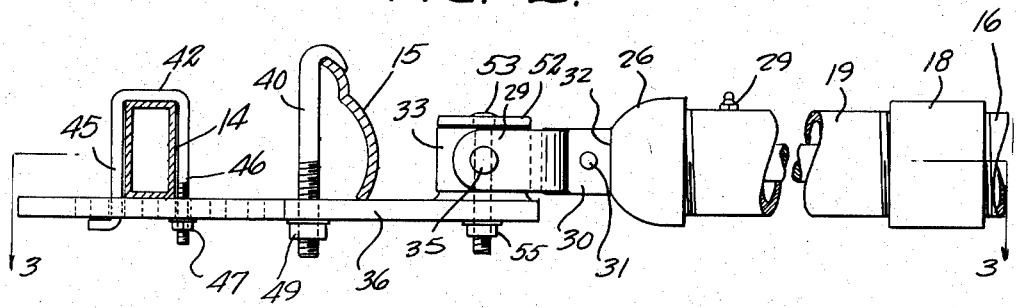
Figure 2 is an enlarged vertical cross sectional view taken on the line 2—2 of Figure 1.

As shown in Figure 2, each U bolt 42 has a hooked leg 45 engageable through one of the apertures 41 and a threaded leg 46 engageable through another aperture 41 and adapted to receive a fastening nut 47, which when tightened, clamps the bracket plate 36 to the under side of cross member 14. The bracket plate 36 is thus clamped to the under side of cross member 14 by the U bolts 42, 42 disposed at the opposite marginal portions of the bracket plate. By selecting the proper apertures 41, the bracket plate 36 may be clamped to the cross member 14 in a position wherein the upstanding hook bolts 40 engage the top edge of the rear bumper 15, as shown in Figure 2. The hook bolts 40 are provided with the fastening nuts 49, whereby the bracket plate 36 is clamped to the rear bumper 15 by tightening the nuts 49 on the hook bolts 40 in the manner illustrated in Figure 2.

The rear end of the tapering portion 38 of bracket plate 36 is integrally formed with the upstanding cylindrical bearing sleeve member 34, previously mentioned. As previously stated, the annular collar member 33 is rotatably engaged on the upstanding cylindrical sleeve 34 for free rotation around a vertical axis. Designated at 50 is an annular retaining member having a cylindrical main body portion 51 which is received within the upstanding bearing sleeve 34 and having a horizontal annular flange portion 52 engaged on the top edge of said sleeve 34. A vertical fastening bolt 53 extends through the retaining member 50 and through an aperture provided therefor centrally in the bottom wall of the upstanding cylindrical sleeve 34, as shown in Figure 4. A fastening nut 55 is engaged on the threaded lower end of bolt 53, which when tightened, secures the retaining member 50 on the top rim of sleeve 34. The flange 52 overlies the top edge of the collar member 33 and retains said collar member on the sleeve 34 while allowing free rotation of the collar member around the vertical axis of the sleeve.

As will be readily apparent, the drawbar 16 and the housing 19 are free to angle around the transverse horizontal axis defined by the studs 35, 35 and to pivot around the vertical axis of the sleeve 34. Said drawbar 16 and housing 19 are also free to rotate around the longitudinal axis defined by the shank member 22. The assembly thus provides three degrees of rotational freedom of the trailer 12 with respect to the towing vehicle, namely, around three mutually perpendicular axes comprising the longitudinal axis of shank 22, the transverse axis of the pivot studs 35, 35, and the vertical axis of the bearing sleeve 34. There is thus provided a flexible connection between the trailer and the towing vehicle which is at the same time reliable and secure.

In the modification illustrated in Figures 5 and 6, the main bracket plate, designated at 36', has the tapering rear portion 38' provided at its respective forward corners with apertures 56, 56 to receive hook bolts 40, as described previously, for engaging the top edge of the rear bumper of the towing vehicle. The bracket plate 36' is provided with a generally rectangular forward portion 37' which is formed with the longitudinally extending row of spaced apertures 41' adapted to receive the legs of a U bolt 42, such as is illustrated in Figures 1 to 4, to clamp the plate 36' to the under side of the rear cross bar 14 of the towing vehicle.

An extension bar, shown at 60 in Figure 7, may be employed with the forward bracket portion 37' with towing vehicles wherein the rear transverse cross member is spaced a substantial distance from the rear bumper of the vehicle, said distance being longer than the plate portion 37' shown in Figure 5. The bar 60 is formed at its forward end with an aperture 61 registrable with one of the apertures 41' to receive a fastening bolt, and is formed with an elongated longitudinal slot 62 registrable with another of the apertures 41' to receive an additional fastening bolt, whereby the extension bar 60 may be rigidly secured to the member 37' to increase the effective length of said member.

Member 37' is provided at its forward end with a transverse slot 63 which may receive the hooked leg of a U bolt employed to secure the plate 38' to the end cross bar of the frame of the towing vehicle, the threaded leg of the U bolt being engageable through one of the apertures 41'. The extension bar 60 is formed with a similar transverse slot 63' which may be employed in the same manner as the slot 63 when the extension bar 60 is fastened to the member 37', as above described. The threaded leg of the U bolt may be then engaged through the slot 62 to receive a fastening nut on its lower portion, whereby the assembly may be clamped to the cross bar at the rear end of the vehicle frame in the manner previously described. The hooked bolts 40 of Figures 1 to 4 may be employed in the apertures 56 in the modification shown in Figures 5 and 6, to secure the member 38' to the vehicle bumper.

The rear end portion of member 38' is formed with the internally threaded upstanding cylindrical wall 64 which is annularly shouldered at 65, as shown in Figure 6. Designated at 66 is a plug member having a depending, externally threaded main body portion 67 which is threadedly engaged in the upstanding cylindrical member 64, as shown in Figure 6, and which is provided with the top flange portion 68 which is disposed opposite the annular shoulder 65 and which acts as a retaining means to retain a bearing ring 69 on the bearing seat defined externally of the member 64. A leaf spring 69' is fastened to the top surface of the flange 68, as shown in Figure 6, said leaf spring having secured to its free portion a depending pin element 70 which extends through an aperture 71 in the flange 68 and which is lockingly engageable in right triangular notches 72 formed in the top rim of the member 64 to secure the flange 66 against the top rim of member 64. The pin 70 may be manually elevated, whenever required, so that the member 67 may be unthreaded from the member 64 to provide access to the interior of member 64. Said interior contains a quantity of lubricant 73 which reaches the bearing surfaces between ring 69 and member 64 through apertures 75 formed in member 67 and communicating with the notches 72.

Ring member 69 is provided with the diametrically oppositely extending pivot lugs 77, 77 which pivotally engage in the respective arms of a U-shaped yoke member 78 which is rigidly connected to a shank 79 axially and rotatably received in a cylindrical housing 19'. The rear end of the shank 79 is formed with a circular head 23' which engages against an annular bushing 20', in turn rotatably engaged by means of roller bearings 80 with an annular member 81 bearing against the rear rim of housing 19'. The coupling sleeve 18 connects the rear portion of housing 19' to the tubular drawbar 16, as in the previously described form of the invention. A cap member 26 is threadedly engaged on the forward end of sleeve 19' and a ball bearing assembly 83 is provided between the shank 79 and the cap 26, as shown in Figure 5. Deformable packing material 28 is provided in the cap between the ball bearing assembly 83 and the interior surface of the cap, as shown in Figure 5, and sealingly engaging the rotatable shank 79.

As in the previously described form of the invention, the drawbar 16 in the form of the invention illustrated in Figures 5 and 6 may freely rotate around the axis of shank 79 and may pivot around the transverse axis of studs 77, 77 as well as around the vertical axis of the bearing ring 69.

While certain specific embodiments of an improved equipment hitch assembly have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An equipment hitch assembly comprising a main bracket plate, means for securing said plate to the rear portion of a towing vehicle, vertical pivot means on said plate, a ring element rotatably engaged on said vertical pivot means for free rotation around a vertical axis, transverse pivot studs on said ring element in the same transverse vertical plane as the axis of said ring element, yoke means rotatably engaged on said pivot studs, a longitudinal shank element rigidly connected to said yoke means substantially in longitudinal horizontal alignment with said vertical pivot means, a sleeve-like housing receiving said shank element axially therein, a first annular bearing member secured in the forward end of said housing and rotatably supporting said shank element in the housing, a second annular bearing member secured in the rear portion of said housing and rotatably supporting said shank element therein, an annular head element on the end of said shank element and rotatably engaging against the rear side of said second annular bearing member, a drawbar member adapted to be connected to a trailer vehicle, and means connecting the rear end of said housing to said drawbar member with the head element substantially in abutment with but being rotatable with respect to the end of said drawbar member.

References Cited in the file of this patent

UNITED STATES PATENTS

| | | |
|---|---|---|
| 2,221,278 | Utterback | Nov. 12, 1940 |
| 2,457,885 | Gatch | Jan. 4, 1949 |
| 2,570,933 | Fobes | Oct. 9, 1951 |

FOREIGN PATENTS

| | | |
|---|---|---|
| 1,074,895 | France | Apr. 7, 1954 |
| 604,394 | Germany | Oct. 22, 1934 |